United States Patent
Koharagi et al.

(10) Patent No.: US 6,369,478 B1
(45) Date of Patent: Apr. 9, 2002

(54) PERMANENT-MAGNET-TYPE ELECTRIC ROTATING MACHINE AND AIR COMPRESSOR AND GENERATOR USING THE SAME

(75) Inventors: Haruo Koharagi, Taga-gun; Tsukasa Taniguchi, Hitachi; Miyoshi Takahashi, Hitachi; Shinichi Wakui, Hitachi; Yasuo Fukushima, Kitasouma-gun; Haruo Miura; Naohiko Takahashi, both of Niihari-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,522

(22) Filed: Feb. 27, 2001

(30) Foreign Application Priority Data

Sep. 26, 2000 (JP) ........................................ 2000-297052

(51) Int. Cl.[7] ............................................... H02K 21/12
(52) U.S. Cl. ............................ 310/156.48; 310/156.23; 310/156.28; 310/216
(58) Field of Search ........................ 310/156.01, 156.12, 310/156.13, 156.15, 156.23, 156.28, 156.29, 156.36, 156.47, 156.59, 216, 254, 259, 44, 45

(56) References Cited

U.S. PATENT DOCUMENTS

| | | | |
|---|---|---|---|
| 3,968,390 A | * | 7/1976 | Yasuda et al. ............... 310/156 |
| 4,406,958 A | * | 9/1983 | Palmero et al. ........... 310/49 R |
| 4,694,654 A | * | 9/1987 | Kawamura ................... 60/605 |

* cited by examiner

Primary Examiner—Nestor Ramirez
Assistant Examiner—Thanh Lam
(74) Attorney, Agent, or Firm—Antonelli, Terry, Stout & Kraus, LLP

(57) ABSTRACT

In an ultra-permanent-magnet-type electric rotating machine including a stator in which a winding of armatures is wound in each of a plurality of slots of a stator core, and a rotor having permanent magnets respectively inserted into permanent-magnet-inserting holes in a magnetic steel sheet ring provided at an outer periphery of a conductive and magnetic shaft, the thickness of the stator core is 0.1 to 0.2 mm, and the magnetic steel sheet ring is made of a high-tensile-strength magnetic steel sheet had tensile strength of 80 kg/mm$^2$ or more.

33 Claims, 7 Drawing Sheets

PERMANENT-MAGNET-TYPE ELECTRIC ROTATING MACHINE AND AIR COMPRESSOR AND GENERATOR USING THE SAME

BACKGROUND OF THE INVENTION

1. Field of the Invention

The present invention relates to a permanent-magnet-type electric rotating machine, and more particularly concerns an air compressor and a high-speed generator such as a microturbine generator using the permanent-magnet-type electric rotating machine.

2. Description of the Related Art

Since a permanent-magnet-type synchronous motor has high efficiency, the permanent-magnet-type synchronous motor is frequently used as an industrial driving source. When the revolutions of the motor are low, the motor is used in a manner such that permanent magnets are attached to a shaft; on the contrary, when the revolutions of the motor are high, there is a risk such that the permanent magnets scatter.

In the high-speed permanent-magnet-type synchronous motor, in order to solve the above problems, a method of providing a carbon fiber or a titanium ring at the periphery of the permanent magnet is disclosed in Japanese Unexamined Patent Application Publication No. 10-243586.

In the above-described related art, although the scattering of the permanent magnets can be prevented, a problem such that since the permanent-magnet-type synchronous motor is driven by an inverter, the temperature of a winding rises due to pulsating flux by a higher harmonic current and a problem regarding the vibration in a rotor are not considered.

SUMMARY OF THE INVENTION

Accordingly, it is an object of the present invention to provide a permanent-magnet-type electric rotating machine in which even when driven by the inverter that operates with a fundamental frequency of several hundreds Hz or more, no problem occurs regarding the rise in temperature of the winding and the vibration of the rotor, so that a stable high-speed revolution can be obtained, and to provide an air compressor and a high-speed generator using the same.

It is a feature of the present invention to provide a ultra-permanent-magnet-type electric rotating machine including a stator in which a winding of an armature is wound in each of a plurality of slots of a stator core, and a rotor having permanent magnets respectively inserted into permanent-magnet-inserting holes in a magnetic steel sheet ring provided at the periphery of a conductive and magnetic shaft, wherein the thickness of the stator core is 0.1 to 0.2 mm, and the magnetic steel sheet ring is made of a high-tensile-strength magnetic steel sheet had tensile strength of 80 kg/mm$^2$ or more.

Another aspect of the present invention is that the permanent-magnet-type electric rotating machine is applied to an air compressor.

Another aspect of the present invention is that the permanent-magnet-type electric rotating machine is applied to a high-speed generator.

Another feature of the present invention is that, in the permanent-magnet-type electric rotating machine, a rotor of the air compressor is movably supported by magnetic bearings, and a magnetic steel sheet for the magnetic bearing on the rotor side and a magnetic steel sheet for the stator core are the same.

Another feature of the present invention is that, in the ultra-permanent-magnet-type electric rotating machine including the stator in which the a winding of an armature is wound in each of the plurality of slots of the stator core, and the rotor having permanent magnets respectively inserted into the permanent-magnet-inserting holes in the electromagnet-steel-sheet ring provided at the periphery of the conductive and magnetic shaft, wherein the magnetic steel sheet ring is made of a high-tensile-strength magnetic steel sheet had tensile strength of 80 kg/mm$^2$ or more, and the number of the permanent-magnet-inserting holes are 12 to 16 for each pole.

Another feature of the present invention is that, in the permanent-magnet-type electric rotating machine, slits are interposed between the 12 to 16 permanent-magnet-inserting holes provided for each pole.

Another feature of the present invention is that, in the permanent-magnet-type electric rotating machine, the slit has an R-shape.

Another feature of the present invention is that in the permanent-magnet-type electric rotating machine including the stator in which the a winding of an armature is wound in each of the plurality of slots of the stator core, and the rotor having permanent magnets respectively inserted into the permanent-magnet-inserting holes in a magnetic steel sheet ring provided at the periphery of the conductive and magnetic shaft, wherein the thickness of the stator core is 0.1 to 0.2 mm, the magnetic steel sheet ring is made of the high-tensile-strength magnetic steel sheet had tensile strength of 80 kg/mm$^2$ or more, and the number of the permanent-magnet-inserting holes are 12 to 16 for each pole.

Another feature of the present invention is that, in the permanent-magnet-type electric rotating machine, slits are interposed between the 12 to 16 permanent-magnet-inserting holes for each pole.

Another feature of the present invention is that, in the permanent-magnet-type electric rotating machine, the slit has an R-shape.

Another feature of the present invention is that, in the permanent-magnet-type electric rotating machine, the rotor of the air compressor is movably supported by the magnetic bearings, and the magnetic steel sheet for the magnetic bearing on the rotor side and the magnetic steel sheet for the stator core are the same.

Another feature of the present invention is that, in the permanent-magnet-type electric rotating machine, a gap is provided between the permanent-magnet-inserting hole and the permanent magnet, into which a filler is filled.

Another feature of the present invention is that, in the permanent-magnet-type electric rotating machine, the permanent-magnet-inserting holes are arranged in the vicinity of the center of the inner and outer peripheries of the magnetic steel sheet ring.

Another feature of the present invention is that, in the permanent-magnet-type electric rotating machine, the gap length as the difference between the inner diameter of the stator core and the outer diameter of the magnetic steel sheet ring is 2 to 3 mm.

Another feature of the present invention is that, in the permanent-magnet-type electric rotating machine, the inner and outer periphery surfaces of the permanent magnet have curvature.

Another feature of the present invention is that, in the permanent-magnet-type electric rotating machine, the inner and outer periphery surfaces of the permanent magnet are planar.

Another feature of the present invention is that, in the permanent-magnet-type electric rotating machine, the width in a radial direction of the permanent-magnet-inserting hole and that of the permanent magnet differ.

The present invention is not limited to the above but includes the combination of the above features.

DESCRIPTION OF THE PREFERRED EMBODIMENTS

In a permanent-magnet-type synchronous electric rotating machine, magnetic flux of permanent magnets is led to a stator via a shaft of a rotor and a high-tensile-strength magnetic steel sheet. When an inverter drives the permanent-magnet-type electric rotating machine with a fundamental frequency of several hundreds Hz or more, it is called an ultrahigh-speed electric rotating machine. In this case, higher-harmonic magnetic flux generates arising from a higher-harmonic current from the inverter. The influential orders of the higher harmonic are 5th, 7th, 11th, 13th, 17th, and 19th as high as the fundamental frequency so as to generate a higher harmonic loss at component members. As a result, a heat spot generates at each of the component members, problems regarding vibration occur in the rotor, and the temperature in a stator winding rises, so that the ultrahigh-speed permanent-magnet synchronous electric rotating machine cannot be realized. However, in the permanent-magnet electric rotating machine, preferably, a plate thickness of a stator core is 0.1 to 0.2 mm, and a high-strength magnetic steel sheet having a tensile strength of 80 kg/mm$^2$ or more is used for a magnetic steel sheet ring provided at the periphery of a rotor shaft since no heat spot generates at the component members even if the device is driven by the inverter including the higher-harmonic current of 5th, 7th, 11th, 13th, 17th, and 19th as high as the fundamental frequency so that no problem occurs regarding the vibration in the rotor. In addition, rise in the temperature of the stator winding is suppressed so that a high-speed permanent-magnet-type electric rotating machine can be provided.

Preferably, for providing a maintenance-free air compressor, such a permanent-magnet-type electric rotating machine is applied to an air compressor. Also, for providing a high-speed revolving generator, the device is preferably applied to a generator.

In addition, preferably, for providing a cheap air compressor, the rotor of the air compressor is movably supported by magnetic bearings, and a magnetic steel sheet for the magnetic bearing on the rotor side and a magnetic steel sheet for the stator core are the same.

In addition, preferably, for providing a permanent-magnet-type electric rotating machine capable of rotating at a high speed, the magnetic steel sheet ring of the permanent-magnet-type electric rotating machine is made of the high-strength magnetic steel sheet of tensile strength of 80 kg/mm$^2$ or more and the number of the permanent-magnet-inserting holes is 12 to 16 for each pole since no problem occurs regarding the vibration in the rotor.

In addition, preferably, for providing the permanent-magnet-type electric rotating machine capable of rotating at a high speed, slits are interposed between the 12 to 16 permanent-magnet-inserting holes for each pole in the permanent-magnet-type electric rotating machine since no heat spot generates at the rotor, posing no problem regarding the vibration in the rotor.

Also, preferably, for providing the permanent-magnet-type electric rotating machine capable of rotating at a high speed, the slit has an R-shape since the arrangement position of the permanent magnets can be fixed, posing no problem regarding the vibration in the rotor.

Also, preferably, for providing the permanent-magnet-type electric rotating machine capable of rotating at a high speed, the thickness of the rotor core is 0.1 to 0.2 mm, the magnetic steel sheet ring is made of the high-tensile-strength magnetic steel sheet had tensile strength of 80 kg/mm$^2$ or more, and the number of the permanent-magnet-inserting holes is 12 to 16 for each pole since no heat spot generates at the component members even when the device is driven by the inverter including a higher harmonic current of 5th, 7th, 11th, 13th, 17th, and 19th as high as the fundamental frequency. Accordingly, no problem occurs regarding the vibration in the rotor, and the rise in the temperature of the rotor winding is suppressed.

Furthermore, preferably, for providing the permanent-magnet-type electric rotating machine capable of rotating at a high speed, slits are interposed between the 12 to 16 permanent-magnet-inserting holes for each pole in the permanent-magnet-type electric rotating machine since no heat spot generates at the rotor, posing no problem regarding the vibration in the rotor.

Furthermore, preferably, for providing the permanent-magnet-type electric rotating machine capable of rotating at a high speed, the slit has an R-shape since the arrangement position of the permanent magnets can be fixed, posing no problem regarding the vibration in the rotor.

Furthermore, in the permanent-magnet-type electric rotating machine, preferably, for providing the permanent-magnet-type electric rotating machine capable of rotating at a high speed, a gap is provided between the permanent-magnet-inserting hole and the permanent magnet, into which a filler is filled since the arrangement position of the permanent magnets can be fixed, posing no problem regarding the vibration in the rotor.

Furthermore, in the permanent-magnet-type electric rotating machine, preferably, for providing the permanent-magnet-type electric rotating machine capable of rotating at a high speed, and the air compressor and the generator using the same, the permanent-magnet-inserting holes are arranged in the vicinity of the center of the diameter of the magnetic steel sheet ring since no problem occurs regarding the vibration in the rotor.

Furthermore, in the permanent-magnet-type electric rotating machine, preferably, for providing the permanent-magnet-type electric rotating machine capable of rotating at a high speed, and the air compressor and the generator using the same, the gap length as the difference between the inner diameter of the stator core and the outer diameter of the magnetic steel sheet ring is 2 to 3 mm since the loss generated at the stator is reduced even when the device is driven by the inverter including the higher-harmonic current of 5th, 7th, 11th, 13th, 17th, and 19th as high as the fundamental frequency and the rise in the temperature of the winding is restricted.

Furthermore, in the permanent-magnet-type electric rotating machine, preferably, for providing the permanent-magnet-type electric rotating machine capable of rotating at a high speed, and the air compressor and the generator using the same, inner and outer peripheral surfaces of the permanent magnet have curvature since the centrifugal force of the magnet is uniformly applied to the magnetic steel sheet ring, posing no problem regarding the vibration in the rotor.

Furthermore, in the permanent-magnet-type electric rotating machine, preferably, for providing the cheap permanent-magnet-type electric rotating machine, and the air compressor and the generator using the same, the inner and outer peripheral surfaces of the permanent magnet are planar since cheap magnets can be used.

Also, in the permanent-magnet-type electric rotating machine, preferably, for providing the permanent-magnet-type electric rotating machine capable of rotating at a high speed, and the air compressor and the generator using the same, the width in the radial direction of the permanent-magnet-inserting hole and that of the permanent magnet are different since the arrangement position of the permanent magnets can be fixed, posing no problem regarding the vibration of the rotor.

Figure 2:
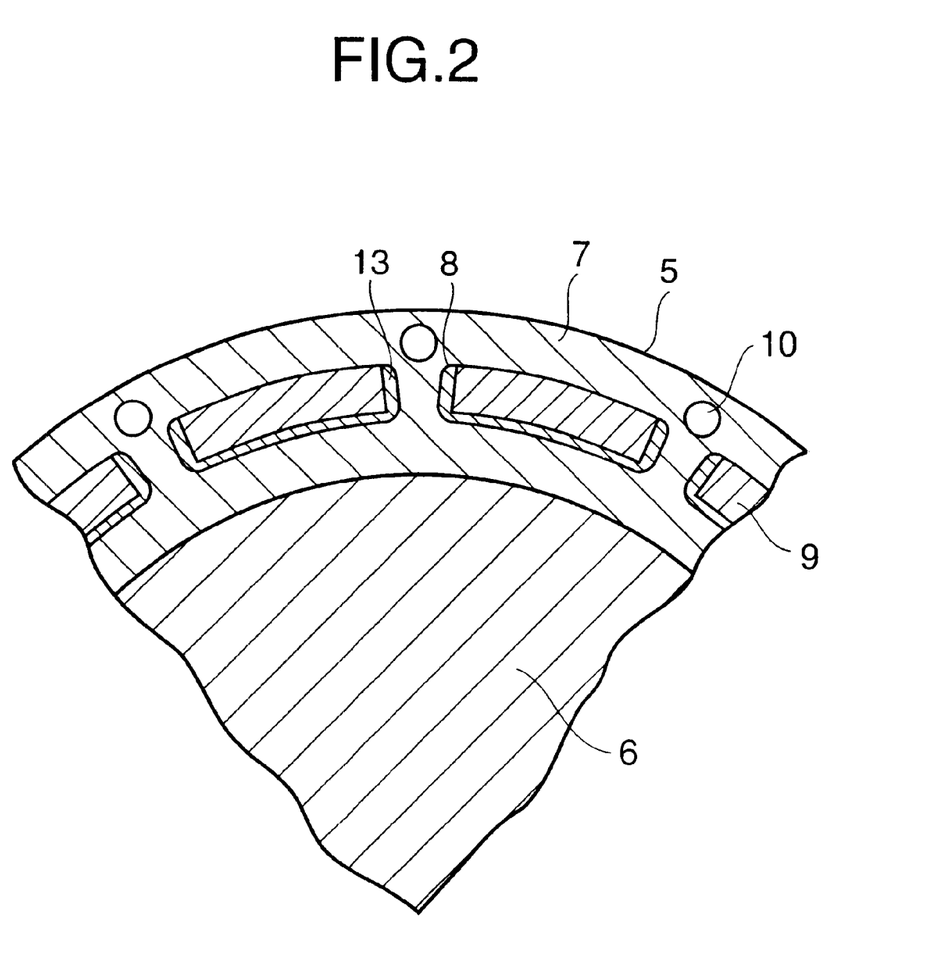
FIG. 2 is a cross-sectional view in a radial direction of a rotor according to an embodiment of the present invention.
Figure 3:
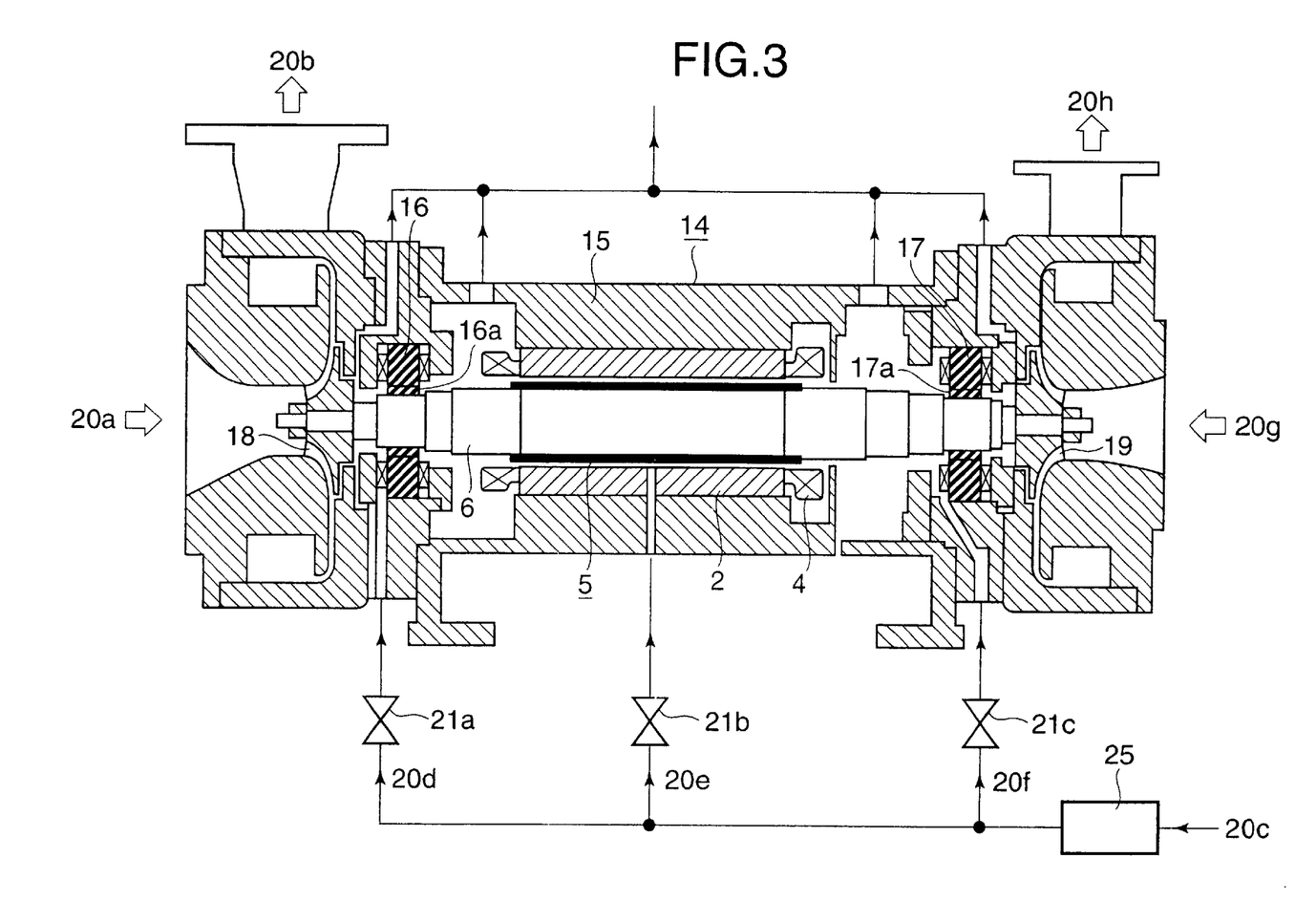
FIG. 3 is an air compressor according to an embodiment of the present invention.

An embodiment of the present invention will be described hereinbelow with reference to FIGS. 1 to 3. In the drawings, like numerals indicate like or corresponding parts throughout.

Figure 1:
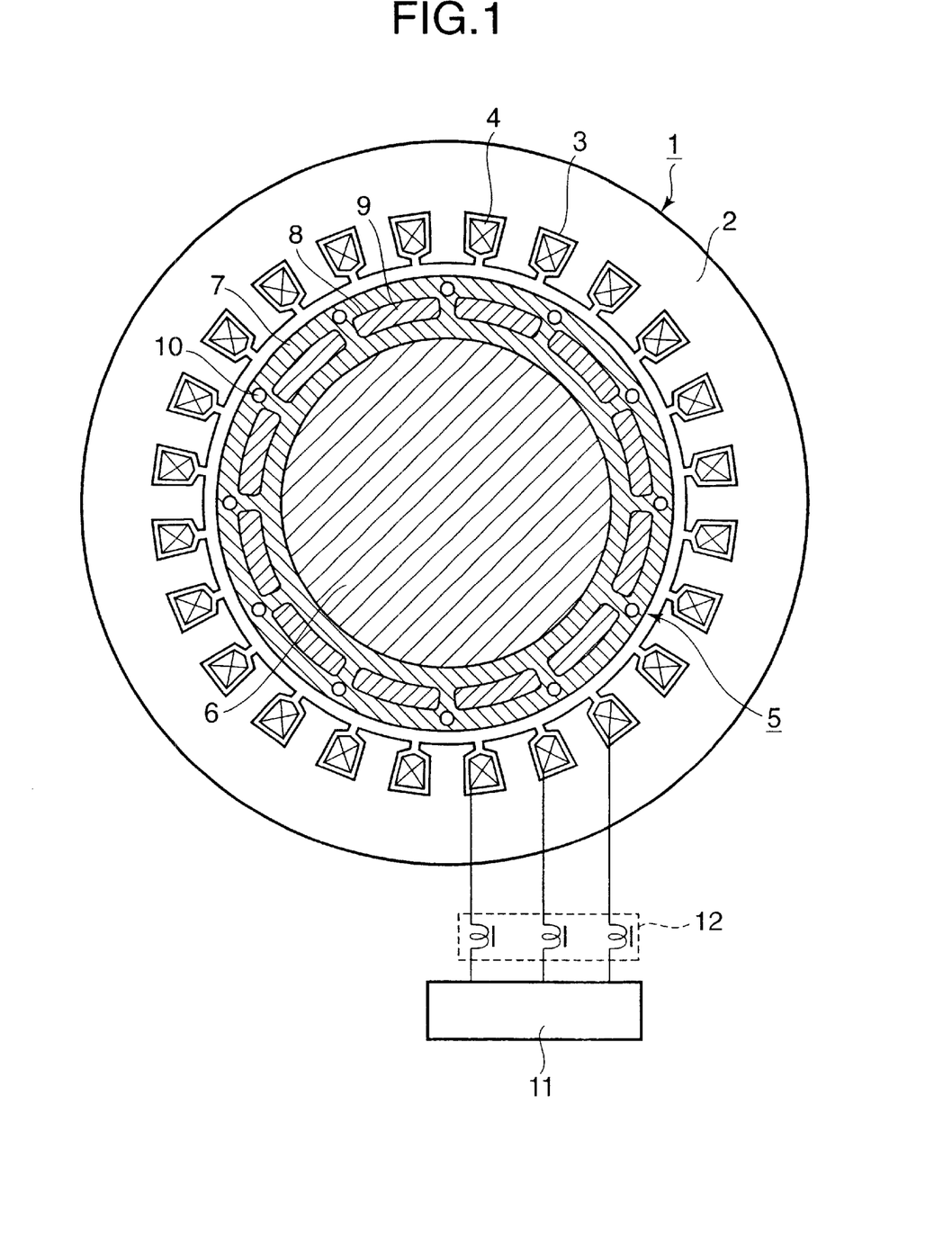
FIG. 1 is a cross-sectional view in a radial direction of a permanent-magnet-type rotating armature according to an embodiment of the present invention.

FIG. 1 is a cross-sectional view in a radial direction of a permanent-magnet-type electric rotating machine according to an embodiment of the present invention. FIG. 2 is a cross-sectional view in a radial direction of a rotor according to the embodiment of the present invention. FIG. 3 is an air compressor according to the embodiment of the present invention.

The permanent-magnet electric rotating machine comprises a stator 1 and a rotor 5 as shown in FIG. 1. The stator 1 comprises three-phase (U, V, and W) a winding of armatures 4 wound in a plurality of slots 3 provided for a stator core 2. The rotor 5 has, as shown in FIG. 2, a magnetic steel sheet ring 7 at the periphery of a shaft 6 having conductivity and a magnetic property. The magnetic steel sheet ring 7 has permanent magnets 9 each enclosed in permanent-magnet-inserting holes 8 arranged uniformly in a peripheral direction thereof. A filler 13 is filled in a gap between the permanent-magnet-inserting holes 8 and the permanent magnets 9, and slits 10 are each disposed between the permanent-magnet-inserting holes 8. The permanent magnets 9 are provided in the vicinity of the center of an inner periphery and an outer periphery of the magnetic steel sheet ring 7 and each of the inner and outer peripheries of the permanent magnets has a convex curvature in an outer direction thereof. Accordingly, a centrifugal force of the permanent magnets 9 is uniformly applied to the inner peripheral surface of the magnetic steel sheet ring 7. In the permanent-magnet-type electric rotating machine, in case of driving a motor, the motor is supplied with an alternating current from an inverter 11 via a reactor 12 and is driven at a variable speed by varying the frequency. In case of driving a generator, the electric rotating machine is used as a high-frequency generator, in which the generated power is made to available power via the reactor 12 and the inverter 11 (also including a converter).

The permanent-magnet-type electric rotating machine as an object of the embodiment drives an impeller in the air compressor or the like, and is an ultrahigh-speed device of revolutions of 30,000 rpm or more. In this instance, a problem in the embodiment is a higher harmonic current from the inverter. In view of a driving frequency of the inverter, the electric rotating machine is a bipolar device. Accordingly, the driving frequency is 500 Hz or more. Since the current from the inverter of 500 Hz or more is subjected to adjustment of an applied voltage by PWM (pulse width modulation), the higher harmonic is multiplexed, wherein when the frequency is analyzed, the higher harmonic of 5th, 7th, 11th, 13th, 17th, or 19th as high as the fundamental frequency is multiplexed. An air compressor 14 has in a frame 15 (all storage frames are generically called it), as shown in FIG. 3, the shaft 6 movably supported by magnetic bearings 16 (16a denotes a rotor ring in which the shaft 6 is fit) and 17 (17a denotes a rotor ring in which the shaft 6 is fit), the rotor 5 (the magnetic steel sheet ring 7 and the permanent magnets 9) fitted in the shaft 6, and the stator core 2 in which a winding of armatures 4 are provided. In an air compressing process, an impeller 18 provided at an end of the shaft 6 as a first compressing step compresses an air 20a to exhaust an air 20b. An air 20c as part of the air 20b is cooled with an intermediate cooler 25, the magnetic bearing 16 is cooled with an air 20d so cooled via a valve 21a, the permanent-magnet-type electric rotating machine is cooled with an air 20e so cooled via a valve 21b, and the magnetic bearing 17 is cooled with an air 20f so cooled via a valve 21c, and then the cooling airs are gathered to be exhausted. An impeller 19 as the second compressing step compresses an air 20g compressed with the impeller 18 as the first compressing step (the first compressed air is a sum of the airs 20b and 20c) to exhaust an air 20h as an output of the air compressor 14.

Here, it is important that the air that is an output from the air compressor 14 is used as a cooling air for the permanent-magnet-type electric rotating machine. Although the winding of armatures 4 of the permanent-magnet-type electric rotating machine can be directly cooled with the cooling air 20e, much more cooling air is required to obtain a desired temperature of the winding of armatures. Also, cooling efficiency of the rotor 5 is low. This is because the permanent-magnet-type electric rotating machine rotates at ultra-high speed so that an air layer rotating at ultra-high speed exists at the periphery of the rotor 5, and accordingly even if the cooling air 20e is brought into contact with the rotor 5, the generated heat is unlikely to be absorbed. Therefore, if the loss generated at the stator 1 and the rotor 5 is large, the amount of the cooling air 20g must be increased to tens of kW so that the efficiency of the air compressor becomes low. On the other hand, if the amount of the cooling air is decreased in view of the efficiency of the air compressor, the temperature of the a winding of an armature rises so that the temperature of the rotor also rises to generate a heat spot at the rotor, and as a result, a problem occurs in that it is difficult to rotate the armature at high speed because of the vibration of the rotor.

In view of the above problems, in the embodiment, the material and the structure of the ultra-high-speed permanent magnet-type electric rotating machine are specified through various experiments.

The vibration of the rotor and the temperature of the winding of the armature relative to the thickness of the magnetic steel sheet used for the stator core are shown in Table 1 (a high-tensile-strength magnetic steel sheet had tensile strength of 80 kg/mm² is used for the rotor 5).

TABLE 1

| Thickness of Magnetic Steel Sheet | 0.05 mm | 0.1 mm | 0.15 mm | 0.2 mm | 0.25 mm | 0.3 mm | 0.35 mm |
|---|---|---|---|---|---|---|---|
| Rotor Vibration | x | * | * | * | * | * | * |
| Temperature of Winding | — | * | * | * | x | x | x |

As for the rotor vibration, a mark * indicates the case where the device could be stably rotated to a high-speed range, and a mark x indicates the case where it could not be driven to a high-speed range. In Table 1, in the case where the thickness of the magnetic steel sheet of the stator core 2 varied from 0.35 mm to 0.05 mm, when the sheet thickness was 0.05 mm, the revolving vibration increases, and when the sheet thickness is 0.1 mm or more, no problem occurred in the revolving vibration so that the device could be stably driven to a high-speed revolution range. The reason cannot be clearly shown; however, it may be because, in the case of a thin sheet, when the stator 1 is press-fitted (or shrink fitted) into the frame 15, the inner diameter of the stator core 2 is distorted or an end of the stator core 2 is deformed. As for the temperature of the winding of the armature, no data exists regarding the sheet thickness of 0.05 mm. However, the temperature was within a desired range for the sheet thickness of 0.1 mm to 0.2 mm and the temperature exceeded the desired range for the sheet thickness of 0.25 mm or more. The cause cannot be clearly shown; however, when the device was driven only with the fundamental frequency (sine wave driving), the temperature with the thickness of 0.35 mm was within the desired temperature range. Accordingly, it may be due to the higher harmonic current during operation of the inverter.

Consequently, in order to stably drive the permanent-magnet-type electric rotating machine to the high-speed range, it is preferable to use the high-strength magnetic steel sheet had tensile strength of 80 kg/mm² for the rotor 5 and to set the thickness of the magnetic steel sheet used for the stator core 2 to 0.1 mm to 0.2 mm.

In addition, the tensile strength of the high-tensile-strength magnetic steel sheet and the vibration of the rotor are shown in Table 2 (the thickness of the magnetic steel sheet of the stator core 2 was 0.1 mm).

TABLE 2

| Tensile Strength of Magnetic Steel Sheet | 55 | 70 | 80 | 90 |
|---|---|---|---|---|
| Rotor Vibration Division Number of Magnets | | | | |
| 8 | x | x | x | x |
| 10 | x | x | x | x |
| 12 | x | x | * | * |
| 14 | x | x | * | * |
| 16 | x | x | * | * |
| 18 | x | x | x | x |

As for the rotor vibration, a mark * indicates the case where the device could be stably rotated using the division number in a peripheral direction of the permanent magnet for one pole as a parameter, and a mark x indicates the case where the device could not be driven to the high-speed region because of the problem in the rotor vibration. In Table 2, when the tensile strength of the high-tensile-strength magnetic steel sheet for the magnetic steel sheet ring 7 varied from 55 to 90 kg/mm², in the case where the division number of the permanent magnet is 10 or less, the revolving vibration increased whichever tensile-strength of the high-tensile-strength magnetic steel sheet was used, and as a result, a stable high-speed revolution could not be obtained. In the case where the division number of the magnet is 12, when the tensile strength of the high-tensile-strength magnetic steel sheet is 55 to 70 kg/mm², the revolving vibration increased; however when the tensile strength was 80 and 90 kg/mm², the revolving vibration decreased so that the stable high-speed revolution could be obtained. In the case of the division number of the magnet is 14 and 16, similarly to the case of 12, the revolving vibration decreased when the tensile strength was 80 and 90 kg/mm² so that the stable high-speed revolution could be obtained. However, when the division number of the magnet is increased to 18, the revolving vibration increased whichever tensile strength was used so that the stable high-speed revolution could not be obtained. The reason was not clearly shown; however, this is probably because when the division number of the magnet is small, an error in arrangement of the permanent magnets 9 in the permanent-magnet-inserting hole 8 may be the cause, and when the division number of the magnet is increased, a surface area of the permanent magnet 9 decreases so that the higher harmonic current from the inverter increases.

Accordingly, in order to stably drive the permanent-magnet-type electric rotating machine to the high-speed region, it is preferable to use the magnetic steel sheet of thickness of 0.1 mm for the stator core 2, to use the high-tensile-strength magnetic steel sheet had tensile strength of 80 kg/mm² or more for the magnetic steel sheet ring 7 of the rotor 5, and to set the division number in the peripheral direction of the permanent magnet 9 to 12 to 16.

In other words, in order to stably drive the permanent-magnet-type electric rotating machine to the high-speed region, it is preferable to use the high-tensile-strength magnetic steel sheet had tensile strength of 80 kg/mm² or more for the rotor 5 and to set the thickness of the magnetic steel sheet used for the stator core 2 to 0.1 to 0.2 mm. In addition, it is preferable to use the magnetic steel sheet of the thickness of 0.1 mm to 0.2 mm for the stator core 2, to use the high-tensile-strength magnetic steel sheet had tensile strength of 80 kg/mm² or more for the magnetic steel sheet ring 7 of the rotor 5, and to set the division number in the peripheral direction of the permanent magnet 9 to 12 to 16.

Figure 4:
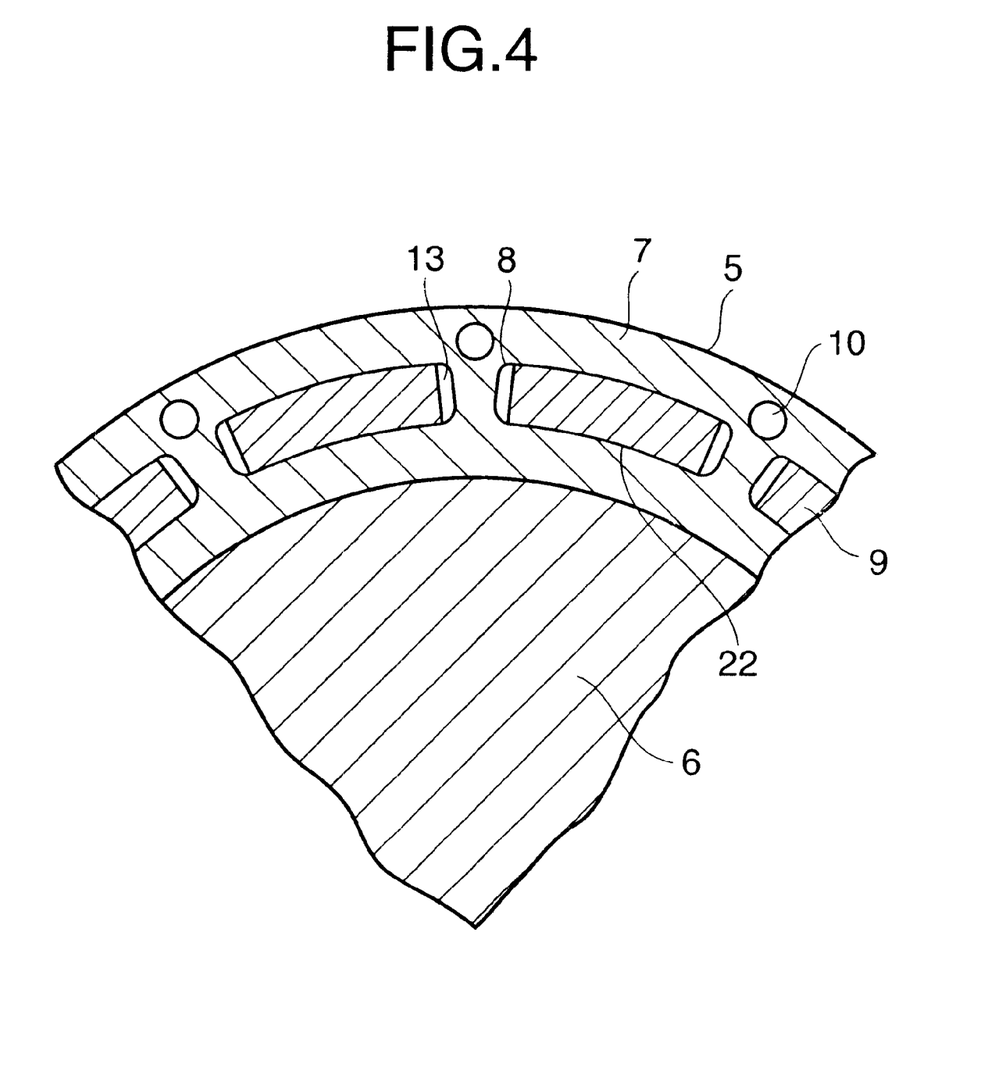
FIG. 4 is a cross-sectional view in a radial direction of a rotor according to another embodiment of the present invention.

FIG. 4 is a cross-sectional view in a radial direction of a rotor according to another embodiment of the present invention. The difference in FIG. 4 from FIG. 2 is that a concave portion 22 is provided so that part of the permanent-magnet-inserting hole 8 is thinner than the thickness of the permanent magnet 9. Thus, the error in arranging the permanent magnet 9 in the permanent-magnet-inserting hole 8 can be decreased, so that the permanent-magnet-type electric rotating machine can be stably driven to the high-speed region.

Figure 5:
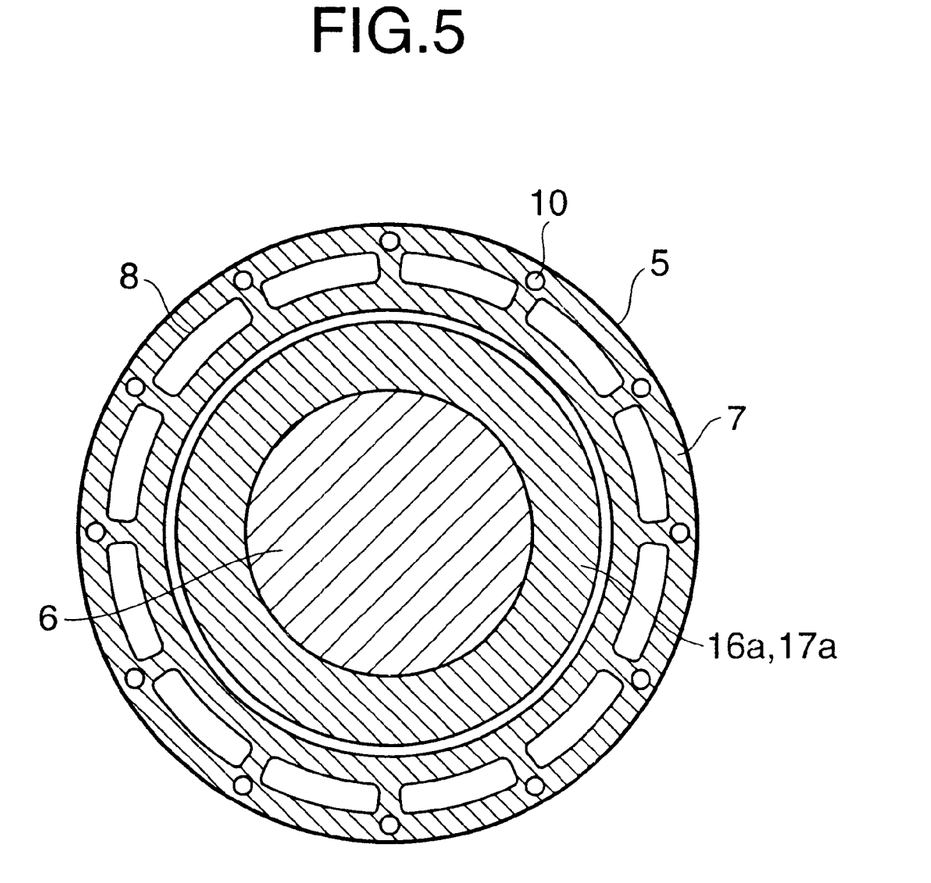
FIG. 5 is a cross-sectional view in a radial direction of a rotor according to still another embodiment of the present invention.

FIG. 5 is a cross-sectional view in a radial direction of a rotor according to still another embodiment of the invention. The difference in FIG. 5 from FIG. 2 is that the stator core 2 and the rotor rings 16a and 17a of the magnetic bearings 16 and 17 are made of the same magnetic steel sheet and are cut to be integrally formed. Consequently, the use efficiency of the stator core 2 can be improved so that the permanent-magnet-type electric rotating machine can cheaply be manufactured.

Figure 6:
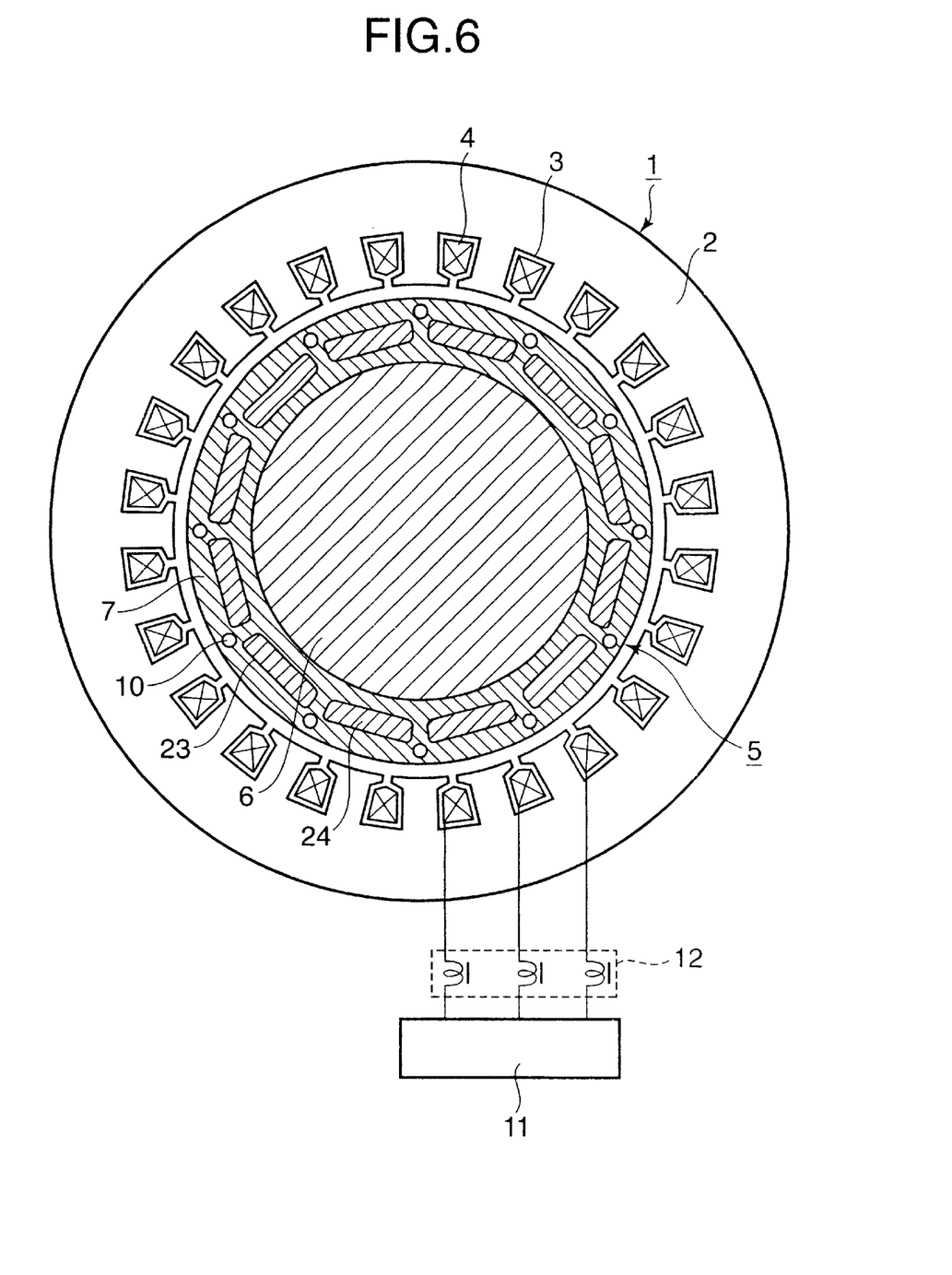
FIG. 6 is a cross-sectional view in a radial direction of a permanent-magnet-type electric rotating machine according to a further embodiment of the present invention.

FIG. 6 is a cross-sectional view in a radial direction of a permanent-magnetic-type electric rotating machine according to a further embodiment of the present invention. The difference in FIG. 6 from FIG. 1 is that a permanent magnet 24 is planar and upper and lower surfaces of a permanent-magnet-inserting hole 23 are straight. Since a rare earth magnet is used for the permanent magnet 24, the planar magnet is cheaper so that a cheap permanent-magnet-type electric rotating machine can be provided.

In the structure of the embodiment, the gap length between the stator core 2 and the rotor 5 is also important. When the gap length is less than 0.2 mm and over 0.3 mm, the temperature of the winding rises; accordingly, a fact that an optimum gap length is within the range from 0.2 to 0.3 mm was confirmed from the results of various experiments; however, the reason is not clear.

Figure 7:
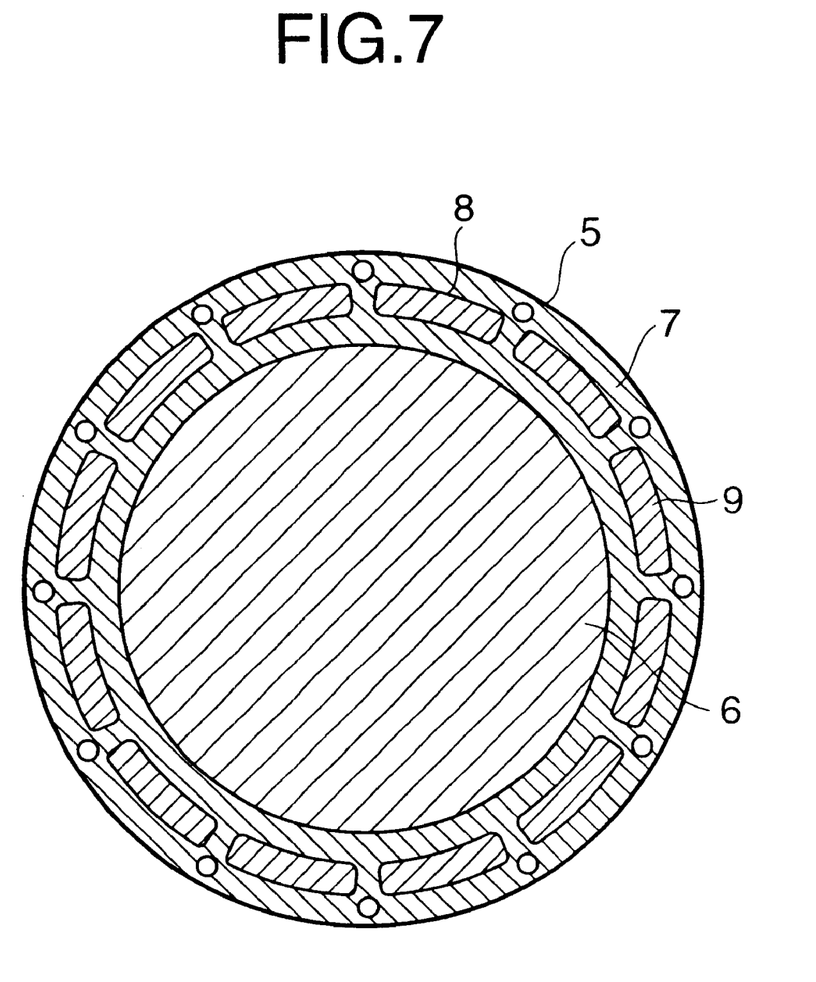
FIG. 7 is a rotor according to another embodiment of the present invention.

FIG. 7 is a cross-sectional view in a radial direction of a rotor according to another embodiment of the present invention. The difference in FIG. 7 from FIG. 1 is that no slit 10 exists. Without slits 10, the machine strength of the rotor core increases, and thereby a higher-speed device can be realized.

Although an application example to the air compressor has been described above, similar effects can be obtained also when the device is used for a microturbine generator with distributed power (the structure comprises a generator, an air compressor, and a turbine, in which the bearing is an air bearing or a gas bearing).

As specifically described above, according to the embodiments of the present invention, for example, there is provided the ultra-permanent-magnet-type electric rotating machine including the stator in which the winding of the armature is provided in each of the plurality of slots of the stator core, and the rotor having the permanent magnets respectively inserted into the permanent-magnet-inserting holes in the magnetic steel sheet ring provided at the periphery of the conductive and magnetic shaft, wherein the thickness of the stator core is 0.1 to 0.2 mm, and the high-tensile-strength magnetic steel sheet had tensile strength of 80 kg/mm$^2$ or more is used for the magnetic steel sheet ring provided at the periphery of the shaft of the rotor. Therefore, even when the device is driven by the inverter operating with the fundamental frequency of several hundreds Hz or more (for example, an inverter including a higher harmonic current of 5th, 7th, 11th, 13th, 17th, or 19th as high as the fundamental frequency), no heat spot generates at the component members, posing no problem regarding the vibration in the rotor. Also, rise in the temperature of the stator winding is suppressed. Accordingly, the permanent-magnet-type electric rotating machine in which the stable high-speed revolution can be obtained, and the air compressor and the high-speed generator using the same can be provided.

According to the present invention, it is an object of the present invention to provide the permanent-magnet-type electric rotating machine in which even when driven by the inverter operating with the fundamental frequency of several hundreds Hz or more, no problem occurs regarding the rise in temperature of the winding and the vibration of the rotor so that the stable high-speed revolution can be obtained, and to provide the air compressor and the high-speed generator using the same.

What is claimed is:

1. A permanent-magnet-type electric rotating machine comprising:
   a stator in which an a winding of an armature is wound in each of a plurality of slots of a stator core; and
   a rotor having permanent magnets respectively inserted into permanent-magnet-inserting holes in a magnetic steel sheet ring provided at an outer periphery of a conductive and magnetic shaft,
   wherein the thickness of the stator core is 0.1 to 0.2 mm, and the magnetic steel sheet ring is made of a high-tensile-strength magnetic steel sheet had tensile strength of 80 kg/mm$^2$ or more.

2. A permanent-magnet-type electric rotating machine according to claim 1, wherein a filler is filled between the permanent-magnet-inserting hole and the permanent magnet.

3. A permanent-magnet-type electric rotating machine according to claim 1, wherein the permanent-magnet-inserting holes are arranged in the vicinity of the center of inner and outer peripheries of the magnetic steel sheet ring.

4. A permanent-magnet-type electric rotating machine according to claim 1, wherein a gap length as the difference between the inner diameter of the stator core and the outer diameter of the magnetic steel sheet ring is 2 to 3 mm.

5. A permanent-magnet-type electric rotating machine according to claim 1, wherein the inner peripheral surface and the outer peripheral surface of the permanent magnet have curvature.

6. A permanent-magnet-type electric rotating machine according to claim 1, wherein the inner peripheral surface and the outer peripheral surface of the permanent magnet are planar.

7. A permanent-magnet-type electric rotating machine according to claim 1, wherein the width in the radial direction of the permanent-magnet-inserting hole and that of the permanent magnet are different.

8. An air compressor comprising the permanent-magnet-type electric rotating machine according to claim 1.

9. An air compressor according to claim 8, wherein the rotor of the air compressor is movably supported by magnetic bearings, and the magnetic steel sheet of the magnetic bearing on the rotor side and the magnetic steel sheet of the rotor core are the same.

10. A generator including the permanent-magnet-type electric rotating machine according to claim 1.

11. A permanent-magnet-type electric rotating machine comprising:
    a stator in which a winding of an armature is wound in each of a plurality of slots of a stator core; and
    a rotor having permanent magnets respectively inserted into permanent-magnet-inserting holes in a magnetic steel sheet ring provided at an outer periphery of a conductive and magnetic shaft,
    wherein the magnetic steel sheet ring is made of a high-tensile-strength magnetic steel sheet had tensile strength of 80 kg/mm$^2$ or more and the number of the permanent-magnet-inserting holes is 12 to 16 for each pole.

12. A permanent-magnet-type electric rotating machine according to claim 11, wherein slits are interposed between the 12 to 16 permanent-magnet-inserting holes for each pole.

13. A permanent-magnet-type electric rotating machine according to claim 12, wherein the slit has an R-shape.

14. An air compressor including the permanent-magnet-type electric rotating machine according to claim 13.

15. A generator including the permanent-magnet-type electric rotating machine according to claim 13.

16. A permanent-magnet-type electric rotating machine according to claim 11, wherein a gap is provided between the permanent-magnet-inserting hole and the permanent magnet, into which a filler is filled.

17. A permanent-magnet-type electric rotating machine according to claim 11, wherein the permanent-magnet-inserting holes are arranged in the vicinity of the center of an inner periphery and an outer periphery of the magnetic steel sheet ring.

18. A permanent-magnet-type electric rotating machine according to claim 11, wherein a gap length as the difference between the inner diameter of the stator core and the outer diameter of the magnetic steel sheet ring is 2 to 3 mm.

19. A permanent-magnet-type electric rotating machine according to claim 11, wherein an inner peripheral surface and an outer peripheral surface of the permanent magnet have curvature.

20. A permanent-magnet-type electric rotating machine according to claim 11, wherein an inner peripheral surface and an outer peripheral surface of the permanent magnet are planar.

21. A permanent-magnet-type electric rotating machine according to claim 11, wherein the width in a radial direction of the permanent-magnet-inserting hole and that of the permanent magnet are different.

22. A permanent-magnet-type electric rotating machine comprising:

a stator in which a winding of an armature is wound in each of a plurality of slots of a stator core; and a rotor having permanent magnets respectively inserted into permanent-magnet-inserting holes in a magnetic steel sheet ring provided at an outer periphery of a conductive and magnetic shaft, wherein the thickness of the stator core is 0.1 to 0.2 mm, the magnetic steel sheet ring is made of a high-tensile-strength magnetic steel sheet had tensile strength of 80 kg/mm$^2$ or more, and the number of the permanent-magnet-inserting holes is 12 to 16 for each pole.

23. A permanent-magnet-type electric rotating machine according to claim 22, wherein slits are interposed between the 12 to 16 permanent-magnet-inserting holes for each pole.

24. A permanent-magnet-type electric rotating machine according to claim 23, wherein the slit has an R-shape.

25. An air compressor including the permanent-magnet-type electric rotating machine according to claim 24.

26. An air compressor according to claim 25, wherein the rotor of the air compressor is movably supported by magnetic bearings and the magnetic steel sheet of the magnetic bearing on the rotor side and the magnetic steel sheet of the rotor core are the same.

27. A generator including the permanent-magnet-type electric rotating machine according to claim 24.

28. A permanent-magnet-type electric rotating machine according to claim 22, wherein a gap is provided between the permanent-magnet-inserting hole and the permanent magnet, into which a filler is filled.

29. A permanent-magnet-type electric rotating machine according to claim 22, wherein the permanent-magnet-inserting holes a re arranged in the vicinity of the center of an inner periphery and an outer periphery of the magnetic steel sheet ring.

30. A permanent-magnet-type electric rotating machine according to claim 22, wherein a gap length as the difference between the inner diameter of the stator core and the outer diameter of the magnetic steel sheet ring is 2 to 3 mm.

31. A permanent-magnet-type electric rotating machine according to claim 22, wherein an inner peripheral surface and an outer peripheral surface of the permanent magnet have curvature.

32. A permanent-magnet-type electric rotating machine according to claim 22, wherein an inner peripheral surface and an outer peripheral surface of the permanent magnet are planar.

33. A permanent-magnet-type electric rotating machine according to claim 22, wherein the width in a radial direction of the permanent-magnet-inserting hole and that of the permanent magnet are different.

* * * * *